United States Patent [19]

Maubray

[11] Patent Number: 5,138,739
[45] Date of Patent: Aug. 18, 1992

[54] WINDSHIELD WIPER AIR DEFLECTOR WITH MOVABLE END PORTIONS

[75] Inventor: Daniel Maubray, Issy-les-Moulineaux, France

[73] Assignee: Valeo Systemes D'Essuyage, Montigny-le-Bretonneux, France

[21] Appl. No.: 582,086

[22] Filed: Sep. 14, 1990

[30] Foreign Application Priority Data

Sep. 22, 1989 [FR] France .................. 89 12465

[51] Int. Cl.⁵ .................. B60S 1/04; B60S 1/38
[52] U.S. Cl. .................. 15/250.42
[58] Field of Search .......... 15/250.42, 250.20, 250.35, 15/250.32, 250.36

[56] References Cited

U.S. PATENT DOCUMENTS

| | | | |
|---|---|---|---|
| 3,103,687 | 9/1963 | Golub et al. | 15/250.42 |
| 3,179,969 | 4/1965 | Glynn | 15/250.32 |
| 3,939,524 | 2/1976 | Knights | 15/250.42 |
| 3,942,212 | 3/1976 | Steger et al. | 15/250.42 |
| 3,967,340 | 7/1976 | Cmolik | 15/250.42 |

FOREIGN PATENT DOCUMENTS

| | | | |
|---|---|---|---|
| 939404 | 10/1963 | United Kingdom | 15/250.42 |
| 1105704 | 3/1968 | United Kingdom | 15/250.42 |
| 2145928 | 4/1985 | United Kingdom | 15/250.42 |

Primary Examiner—Philip R. Coe
Assistant Examiner—Gary K. Graham
Attorney, Agent, or Firm—Dennison, Meserole, Pollack & Scheiner

[57] ABSTRACT

In a deflector for a windshield wiper including an arm on which a blade is pivoted, the deflector is carried by at least one of the elements comprising the arm and blade of the wiper, in such a way as to divert the air streams. In accordance with the invention, the deflector comprises a main section which is carried by at least one of the said elements of the windshield wiper, together with at least one lateral end portion which is movable with respect to the main section.

2 Claims, 1 Drawing Sheet

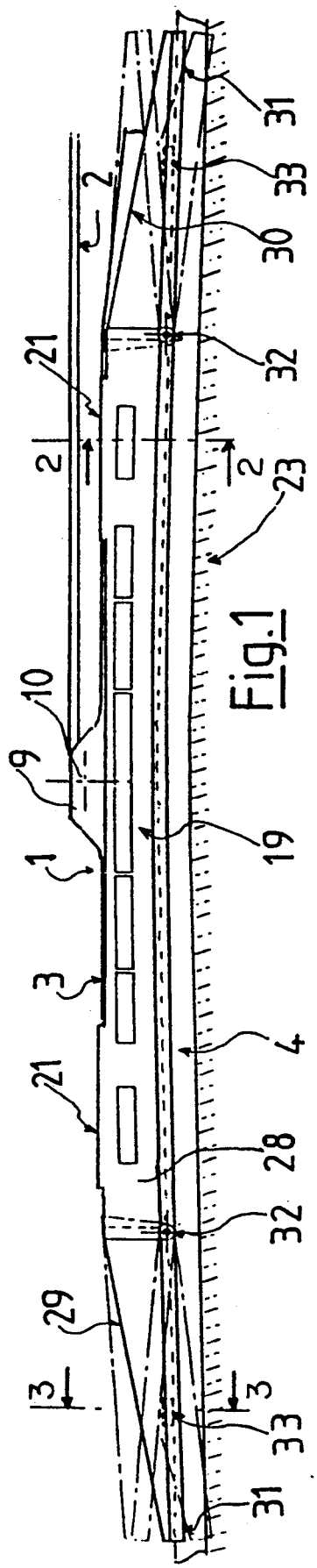
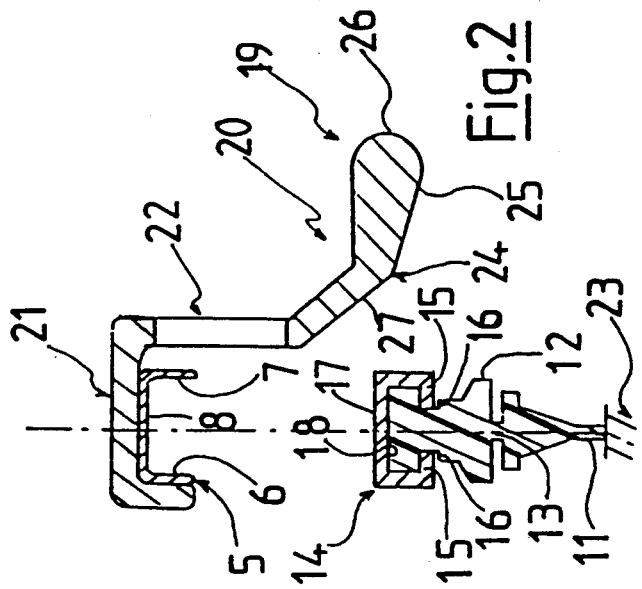
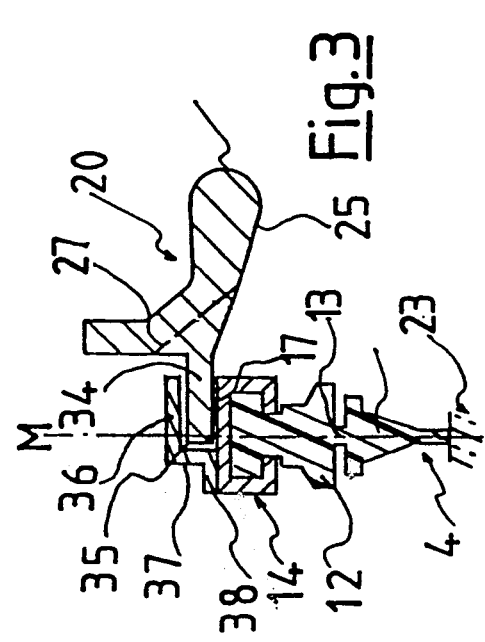

५,१३८,७३९

WINDSHIELD WIPER AIR DEFLECTOR WITH MOVABLE END PORTIONS

FIELD OF THE INVENTION

The present invention relates to an air deflector of the kind having movable portions, for a windshield wiper, in particular for automotive vehicles.

BACKGROUND OF THE INVENTION

An air deflector is usually employed in conjunction with a windshield wiper, the latter generally comprising a wiper arm carrying a wiper blade, the function of the deflector being to divert air streams which impinge on the wiper blade when the vehicle on which the wiper is mounted is in motion at high speed, so as to prevent disengagement of the wiper blade from the surface being swept, which may occur due to the effect of aerodynamic forces generated by the air streams.

To this end, such a deflector should have its free edge directed towards the swept surface, which is of course in general the windshield of an automotive vehicle, this edge being arranged as close as possible to the swept surface in order to reduce to a minimum the space between the swept surface and the edge of the deflector. This is so that the air streams are prevented from being able to penetrate into this space in such a way as to give rise to a danger of setting up a lifting force on the deflector, such as to tend to raise it and thus to raise the windshield wiper to which it is connected.

This proximity of the edge of the deflector to the swept surface does however create a considerable problem due to the fact that windshields have, in practice, a large curvature, with this curvature developing in the direction of wiping movement of the windshield wiper, that is to say between a side edge of the windshield and its middle part.

One compromise solution has provided a cut-out on a deflector, such that it has a free edge with a curvature which corresponds to the mean curvature of the windshield of the vehicle. However, this solution has certain drawbacks during the wiping movement of the windshield wiper, and in particular at the ends of the wiping movement. What happens is that, towards the end of the sweep of the wiper, parts of the edge of the deflector at its extreme lateral ends become separated by a large amount from the swept surface, and this enables a large air flow to penetrate behind the deflector, thus setting up an aerodynamic force which tends to lift the blade. At the other end of the sweep, these portions of the deflector are brought very close to the swept surfaces, and a slight change in the air flow acting on the deflector can be sufficient to cause the latter to come into scraping contact with the surface, thus damaging the latter and eventually impeding good visibility by the driver.

DISCUSSION OF THE INVENTION

The present invention proposes to overcome the disadvantages mentioned above, by providing an air deflector for a windshield wiper, in which the free edge of the deflector, situated facing towards the swept surface, has a curvature which is variable in accordance with the position of the wiper in its sweep.

In accordance with the invention, an air deflector for a windshield wiper having two elements, one of the said elements being a wiper arm carrying the other of the said elements which comprises a wiper blade, the said deflector being carried by at least one of the said elements, is characterised in that the deflector comprises a main section which is carried by at least one of the said elements of the windshield wiper, together with lateral end portions which are movable with respect to the said main section of the deflector.

This structure has the advantage of providing a deflector in which the edge of the deflector which lies facing the windshield is adapted to follow the curvature of the latter and to substantially hug it, regardless of what this curvature may be and regardless of the actual position of the windshield wiper along its sweep.

The other features and advantages of the invention will appear from the description which follows, which is given by way of example only and with reference to the accompanying drawings.

BRIEF DESCRIPTION OF THE DRAWINGS

FIG. 1 is a front view showing the deflector in accordance with the invention.

FIG. 2 is a view in partial cross section taken on the line 2—2 in FIG. 1.

FIG. 3 is a view in partial cross section taken on the line 3—3 in FIG. 1.

DESCRIPTION OF A PREFERRED EMBODIMENT OF THE INVENTION

With reference first to FIG. 1, this shows a windshield wiper comprising a wiper blade 1 carried pivotally by a windshield wiper arm 2. The wiper blade 1 includes a carrier yoke 3 carrying a wiping strip 4. As is best seen in FIG. 2, the carrier yoke 3 comprises, in known manner, a main stirrup 5 which is elongated and slightly curved, and which has a U-shaped cross section with substantially parallel flanks 6 and 7 perpendicular to the base section 8 of the U. The main stirrup 5 is able to carry the wiping strip 4 directly, or it may alternatively be provided with intermediate swing bars for carrying the wiping strip, with these swing bars being pivoted on to the main stirrup.

Again in known manner, the main stirrup 5 has an opening in the form of a window (not shown), which is delimited laterally by two wing portions 9 which form extensions of the flanks 6 and 7 of the U-shaped channel of the stirrup. The wings 9 are connected together through a pivot pin 10 which allows the carrier yoke to be mounted on a female articulation element, of known type, carried by the end of the wiper arm 2 as can be seen in FIG. 1.

Referring now to FIG. 2, the wiping strip 4 has a wiping lip 11 which is joined to a base portion 12 of the wiping strip through a neck portion 13. The base portion 12 is adapted to receive a bar 14 of plastics material, having a generally hollow, rectangular cross section. The bar 14 includes a pair of opposed gripping portions 15 which penetrate into longitudinal grooves 16 formed in the base 12, and a back portion 17 which lies against the back 18 of the base 12, the back 18 being on the opposite terminal edge of the wiping strip from the wiping lip 11.

The bar 14 can of course be replaced by a web element, for example of metal, arranged in each groove 16 and extending along the whole length of the latter so as to leave the back 18 of the base 12 exposed. For simplicity in the remainder of this description, a wiping strip will merely be referred to in general terms, it being understood that it may have either a resilient bar 14 or else resilient webs in the grooves 16 of the base 12.

The wiper 1 is provided with an air deflector 19, which is carried by the wiper 1 in the example shown, though it may equally be carried by the wiper arm 2. In addition, the deflector 19 may be mounted in such a way as to enable it to be displaced in its plane in the manner described more fully in French patent application No. 89 10041, filed on 26 Jul. 1989. The type of deflector which figures in the remainder of this description (by way of example only) is described in greater detail in French patent application No. 87 13770, filed on 6 Oct. 1987. It is however to be understood that any type of air deflector may be mounted on the windshield wiper.

The air deflector 19, described here simply to ensure proper understanding of this description, consists generally of a profiled portion 20, attachment means 21 for attaching it on to the carrier yoke 3, and connecting means 22 between the profiled portion 20 and the attachment means 21. The connecting means 22 extend towards a surface 23 to be swept, which will typically be the surface of a windshield of an automotive vehicle.

The profiled portion 20 is generally convex in shape towards the surface 23 to be swept, and includes on its inner surface 24 a first substantially flat zone 25 which is inclined at a slight angle with respect to the surface 23, and which extends from a free leading edge 26 towards the rear, that is to say towards the connecting means 22. The leading edge 26 is rounded and is of substantially semi-cylindrical shape.

A second flat zone 27 leads from the first zone 25, and makes, with respect to the surface 23 to be swept, an angle which is greater than the angle between the first zone 25 and the surface 23, so that the profile of the inner surface of the profiled portion 20 is that of a convex dihedral with its convexity facing towards the swept surface 23. The profiled portion 20, and in particular the leading edge 26, is spaced away from the swept surface 23, in such a way as to reduce the distance between the surface 23 and the free edge 26, so as to inhibit the generation of an aerodynamic force on the inner face of the profiled portion 20 comprising the first and second zones 25 and 27. This effect is described in greater detail in the above mentioned French patent application.

Referring now once again to FIG. 1, the deflector 19 has a main section 28 which is carried on the carrier yoke 3 by means of the attachment means 21. The deflector also has at least one end portion, and in this example there are two such end portions 29 and 30. These are movable with respect to the main section 28 of the deflector 19, and are situated respectively to the left and to the right of the latter. Each of these end portions 29 and 30 again includes, in the manner already described above and as is best seen in FIG. 3, a profiled portion 20 having a first zone 25 and a second zone 27. This second zone 27 is extended, in a direction which is substantially orthogonal to the swept surface 23, by means of the connecting means 22. The latter are however not joined to any attachment means such as the means 22 in the central section 28. Instead, the depth of each end portion 29 reduces from the end of the latter nearest to the main section 28 of the deflector towards the extreme lateral edge 31 of the deflector.

Each end portion 29 or 30 is movable in rotation about an axis 32 which is arranged to be carried by the profiled portion 20 of the deflector 19. This pivot axis may of course be replaced by any means such as to allow rotational displacement, for example a resilient connection of the elastomeric type such as to allow the end portions 29 and 30 to be displaced in rotational movement with respect to the main section 28.

In addition, the end portions 29 and 30 are subjected to the action of control means 33 which allow them to be displaced in rotation. To this end, these displacement control means comprise at least one rigid finger 34 projecting from the zone 27 of the profiled portion 20 of the deflector 19. These fingers come into engagement on the wiping strip 4, preferably on the back portion 17 of the resilient bar 14, or (as mentioned above) directly on the back 18 of the base 12 of the wiping strip. As is best seen in FIG. 3, the fingers 34 are oriented so as to be substantially parallel to the swept surface 23, with their free ends 35 being directed towards the windshield wiper 1 and lying slightly beyond the median plane M of the wiping strip 4.

The free end 35 of the control finger 34 may also be disposed with a clearance between the back portion 17 of the bar 14 and a wall 36 which is disposed spaced away from, and parallel to, the said back portion. This wall 36 is connected to the back portion 17 through a web 37 which is carried by a foot 38, the latter being fixed on to the back portion 17 of the bar 14 by any appropriate means. Alternatively, the bar 14, wall 16 and web 37 may be made integrally with each other, for example by moulding. The finger 34 is thus actuated either by the back portion 17 of the bar 14 in a first direction away from the windshield, or else by the wall 36 in a direction towards the windshield.

The operation and purpose of the deflector in accordance with the invention, having its end portions 29 and 30, will now be explained in greater detail with reference to FIG. 1. As is shown in this Figure, the swept surface 23 has a curvature, which is to be followed by the wiping strip 4 with the latter in contact with the swept surface.

When the wiping strip is in engagement on the swept surface 23, the wiping strip 4, and more particularly the lateral end zones of the wiping strip, will hug this curvature, due to their mounting on the carrier yoke 3. This mounting may include, in known manner, a plurality of secondary stirrups and/or clips allowing this curvature to be followed.

During this movement, the fingers 34 are controlled by the bar 14 or by the wall 36. By virtue of the pivoting rotational movements at 32 between the end portions 29 and 30, which are arranged in the vicinity of the lateral end zones of the wiping strip 4 and the main section 28 of the deflector, the end portions 29 and 30 are subjected to rotational movement about the axes 32. During the wiping movement, the curvature of the swept surface 23 is variable, and therefore the control fingers 34 are actuated either by the back portion 17 of the bar 14, or by the wall 36 described above, in such a way as to undergo tilting as shown in phantom lines in FIG. 1, all in such a way as to preserve a constant spacing between the swept surface 23 and the edge 26 of the movable end portions 29 and 30.

The present invention is of course not limited to the embodiment described above, but is to be understood to embrace all variants thereof.

What is claimed is:

1. A windshield wiper comprising a driving wiper arm, a carrier yoke pivotally connected to said wiper arm to be driven thereby, said carrier yoke comprising an inverted U-shaped channel, a wiping strip joined to a support bar and resiliently suspended within said U-shaped channel, an air deflector mounted on said U-shaped channel, said air deflector comprising a main deflector section coextensive with said carrier yoke, said main section having two ends, a deflector end portion pivotally mounted on each end of said main deflector section, said main deflector section and pivotally mounted end deflector portions having a profiled portion extending to one side thereof in the direction of air movement to cause said air deflector to move in the direction of the windshield upon air movement over said profiled portions; and means movably linking said end deflector portions with said support bar whereby flexing of said support bar causes pivotal movement of said deflector portions with respect to the main deflector section.

2. An air deflector according to claim 1 wherein said means movably linking said end deflector portions with said support bar comprise at least one finger projecting from each end deflector portion and slidably retained in an opening in the support bar.

* * * * *